United States Patent
Levitan (10) Patent No.: US 7,454,203 B2
(45) Date of Patent: Nov. 18, 2008

(54) SYSTEM AND METHOD FOR PROVIDING WIRELESS SERVICES TO AIRCRAFT PASSENGERS

(75) Inventor: Benjamin C. Levitan, Raleigh, NC (US)

(73) Assignee: Nextel Communications, Inc., Overland Park, KS (US)

( * ) Notice: Subject to any disclaimer, the term of this patent is extended or adjusted under 35 U.S.C. 154(b) by 433 days.

(21) Appl. No.: 11/242,426

(22) Filed: Sep. 29, 2005

(65) Prior Publication Data

US 2007/0072590 A1 Mar. 29, 2007

(51) Int. Cl.
*H04Q 7/20* (2006.01)
(52) U.S. Cl. ............. 455/431; 455/432.1; 455/414.1; 370/316
(58) Field of Classification Search .......... 455/431, 455/432.1, 414.1, 433; 370/316
See application file for complete search history.

(56) References Cited

U.S. PATENT DOCUMENTS

| | | | |
|---|---|---|---|
| 6,643,510 B2 * | 11/2003 | Taylor | 455/431 |
| 7,242,931 B2 * | 7/2007 | Leuca et al. | 455/431 |
| 2004/0102188 A1 * | 5/2004 | Boyer et al. | 455/422.1 |
| 2004/0253949 A1 * | 12/2004 | Swensen et al. | 455/422.1 |
| 2005/0026608 A1 * | 2/2005 | Kallio et al. | 455/431 |
| 2007/0042772 A1 * | 2/2007 | Salkini et al. | 455/431 |

* cited by examiner

*Primary Examiner*—Danh C Le (57) ABSTRACT

A wireless communications system and method for use with aircraft includes an airline network and an aircraft communications system. The airline network includes a reservation system having a database storing passenger and flight information, an interface to an external network and a home location register. The reservation system includes logic for provisioning a subscriber unit and defining at least one location-based event associated with the subscriber unit. The home location register tracks the location of the subscriber unit. The aircraft communications system includes a wireless base station facilitating radio communication with the provisioned subscriber unit and a second interface to the external network. During operation, the home location register executes the location-based event when the subscriber unit's movement into the location associated with the location-based event is detected.

18 Claims, 6 Drawing Sheets

SYSTEM AND METHOD FOR PROVIDING WIRELESS SERVICES TO AIRCRAFT PASSENGERS

FIELD OF THE INVENTION

The present invention relates generally to wireless communications systems and more particularly to systems and methods for providing wireless services to aircraft passengers.

BACKGROUND OF THE INVENTION

Many passenger aircraft are equipped with fixed, wired passenger air phone systems designed to meet Federal Aviation Administration requirements for aircraft equipment. Air phones facilitate interconnect telephone services for passengers during flight through a satellite link. Because satellite calls are expensive, many airline passengers avoid calling from aircraft equipment and wait until the aircraft lands to connect with local wireless carriers through the passenger's own mobile equipment. These wireless calls are limited to the times and places that external systems are available, and the airlines have no control over the quality of service or the costs incurred by its passengers. Unable to charge for these calls, the airlines also lose a potential source of revenue.

Wireless service availability is often intermittent, unreliable and potentially very expensive in certain locations. The passenger may be roaming away from its home network, and roaming rates for using an available wireless network may be expensive for both the calling and called parties. For example, a call from a traveler visiting a foreign country to a local service such as a hotel may result in roaming charges as well as charges for an international call.

In view of the above, there is a need in the art for a wireless communications system that is adaptable to meet the communications needs of an aircraft and its passengers. There is a further need for a communications system that provides an aircraft with greater control over the usage, quality of service, and revenue associated with the wireless communications services used by its passengers.

SUMMARY OF THE INVENTION

The present invention is a wireless communications system and method for use with aircraft. In one embodiment, a method of operating a wireless communications system for use with an aircraft includes establishing an airline reservation, the airline reservation including a flight identifier, a mobile station identifier, and a vendor service identifier. Wireless communications services are then provided to a subscriber unit associated with the mobile station identifier during flight. When an event associated with the subscriber unit is detected, a message is transmitted a vendor system associated with the vendor service identifier.

In another embodiment, a method for wireless roaming between disparate wireless networks includes establish a roaming relationship between the airline communications network and each of a first and second wireless network. At a first location, a subscriber unit is registered as a roaming device on a wireless aircraft network. The subscriber unit is homed on the first wireless network. The wireless aircraft network and subscriber unit are transported to a second destination local to the second wireless network. The subscriber unit registers with the second wireless network as a roaming device from the airline communications network.

In another embodiment, an airline communications system includes an airline network and an aircraft communications system. The airline network includes a reservation system having a database storing passenger and flight information, an interface to an external network and a home location register. The reservation system includes logic for provisioning a subscriber unit and defining at least one location-based event associated with the subscriber unit. The home location register tracks the location of the subscriber unit. The aircraft communications system includes a wireless base station facilitating radio communication with the provisioned subscriber unit and a second interface to the external network. During operation, the home location register executes the location-based event when the subscriber unit's movement into the location associated with the location-based event is detected.

A more complete understanding of the present invention will be afforded to those skilled in the art, as well as a realization of additional advantages and objects thereof, by a consideration of the following detailed description. Reference will be made to the appended sheets of drawings, which will first be described briefly.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1:
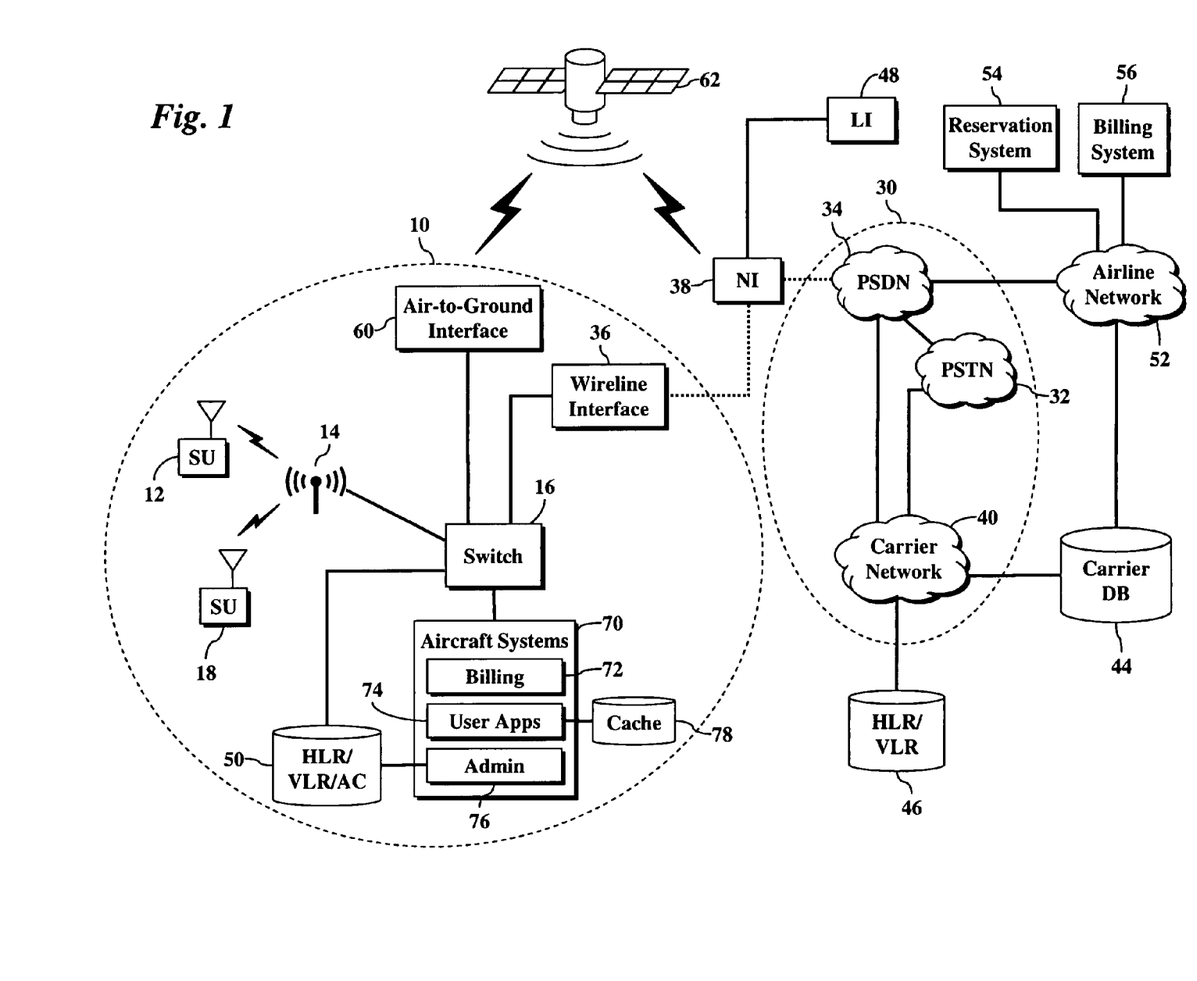
FIG. 1 is an embodiment of an aircraft communications system.

An exemplary embodiment of the present invention will now be described with reference to FIG. 1. An aircraft communications system 10 provides wireless services to at least one subscriber unit 12. In the exemplary embodiment, the aircraft communications system 10 is an iDEN network, but it will be appreciated that in alternate embodiments the aircraft communications system 10 may support other multiple-access wireless communications protocols, such as code division multiple access (CDMA), wideband CMDA (WCDMA), Advanced Mobile Phone Service (AMPS), Global System for Mobile Communications (GSM), General Packet Radio Services (GPRS), High Data Rate (HDR) technology, Push-to-Talk over Cellular (PoC) or voice and data services provided over a broadband network such as WiFi, WiMax, any 802 protocol or similar system.

The aircraft communications system 10 facilitates at least one mode of communication such as interconnect, dispatch, email, short messaging service (SMS), multimedia messaging service (MMS) and packet data communications. The subscriber unit 12 may be any device that is adapted for communication with the wireless communications system 10 such as a mobile phone, pager, personal digital assistant (PDA), a Personal Computer Memory Card International Association (PCMCIA) card, or portable computer.

The aircraft communications system 10 includes an antenna 14 and a switch 16. The antenna 14 is mounted on the interior of an aircraft and provides wireless communications services to the subscriber unit 12 within the aircraft. The switch 16 is connected to the antenna 14 and manages communications within the aircraft including routing communications between the subscriber unit 12 and a second subscriber unit 18, and routing communications between the subscriber unit 12 and an external communications system 30.

In the exemplary embodiment, the external communications system 30 includes a public switched telephone network (PSTN) 32, a public switch data network (PSDN) 34, such as the Internet, and a wireless communications system 40. It will be appreciated that the external networks available to the aircraft communications system 10 at any given time may vary depending on the location of the aircraft and other conditions.

The aircraft communications system 10 includes a wireline interface 36 providing a connection between the switch 16 and the PSDN 34 through a data port while the aircraft is parked at a terminal. In one embodiment, the wireline interface 36 and PSDN 34 facilitate VoIP services, and the PSDN 34 is adapted to route calls through the PSTN 32 through a connection that may include a media gateway. By connecting to a VoIP network, communications via the VoIP network will automatically reroute to the aircraft when the wireline interface 36 is connected at an airport terminal. The aircraft communications system 10 is also adapted to communicate with an airline network 52 to exchange aircraft, passenger and communications information. An air-to-ground interface 60 includes an antenna to facilitate communications with the external communications system 30 during aircraft flight, such as through a satellite system 62.

The switch 16 manages registration, authentication and location updating of the subscriber units 12 and 18. The switch 16 is coupled to a data storage 50, which includes a home location register (HLR) storing subscriber information for the communications system 10, and a visitor location register (VLR) storing information for subscriber units roaming on the communications system 10. The data storage 50 may also include an Authentication Center (AC) to authenticate the subscriber units 12 and 18.

In the exemplary embodiment, the switch 16 further includes wiretap capabilities allowing for continuous monitoring of communications in and out of the aircraft. In operation, communication with the external communications system 30 is directed through an interface 38, which is adapted to route communications to a lawful intercept system 48 for surveillance purposes. The lawful intercept system 48 is adapted to receive communications from the interface 38 and monitor aircraft communications in real time.

The aircraft communications system 10 also includes a computer system 70 located in the aircraft, which includes a billing system 72, a wireless application server 74 and an administration system 76. The billing system 72 processes call detail records (CDR) received from the switch 16, allowing the airline to bill passengers for use of the communication system 10. The wireless application server 74 provides wireless applications to the subscriber units 12 and 18, such as video games for entertainment during a flight. The administration system 76 includes applications for provisioning the subscriber units 12 and 18 for use of the communications system 10, setting up passenger accounts and other administrative functions used by to the aircraft.

A data cache 78 stores frequently requested data content for wireless applications 74. The data cache 78 may store popular web pages, allowing web content to be delivered to multiple subscriber units from the cache 78 while reducing the number of data content requests transmitted to an external network such as the Internet. Content providers may populate the data cache 78 with frequently requested data content and provide the data cache 78 with regular updates for dynamic data such as stock quotes and sports scores. In operation, a request for data content from an external content provider will be fulfilled by the cache 78 if there is a cache hit, otherwise the request is forwarded to the external content provider.

During takeoff and landing airlines generally restrict cell phone operation. In one embodiment, the administration system 76 includes a cellular alarm function and a display. The strength and proximity of the antenna 14 causes the subscriber units 12 and 18 to connect to the aircraft system 10 when in operation. The database 50 stores data describing subscriber units registered with the aircraft system 10, including passenger name and seat number. When wireless communications are restricted, the cellular alarm function detects active subscriber units through the database 50 and identifies the unauthorized subscribers and associated seat number to the flight crew through the display.

A business relationship may be established between the airline (e.g., as a reseller) and a wireless carrier. The airline network 52 includes an interface to a carrier database 44 typically accessed by resellers and retail outlets for entering new subscriber information for the wireless carrier. In this manner, the airline may provision subscriber units for use on the carrier network. It will be appreciated that the airline network 52 may connect to multiple carriers allowing the aircraft to serve as a reseller to each carrier. Through this interface, the airline network and carrier system 42 may exchange subscriber information as described herein.

Figure 2:
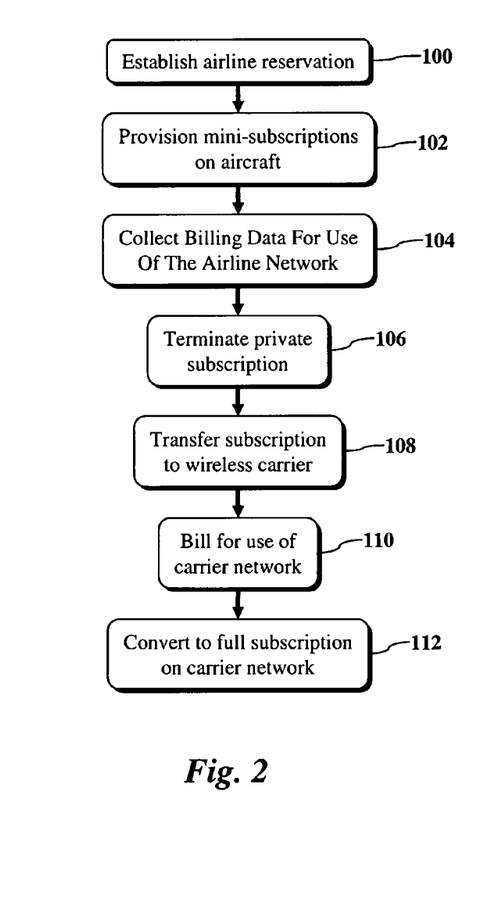
FIG. 2 is a flow diagram illustrating an embodiment of a method for implementing mini-subscriptions.

In operation, the aircraft communications system 10 facilitates temporary subscriptions (referred herein as "mini-subscriptions") providing subscriber units 12 and 18 with temporary access to the aircraft communications system 10. Mini-subscriptions are further described in copending U.S. patent application Ser. No. 11/176,890, filed Jul. 6,2005, which is incorporated herein by reference. Referring to FIG. 2, an embodiment of a process for provisioning subscriber units for temporary use on the aircraft communications system 10 will now be described. In step 100, an airline reservation is established via a reservation system 54 for a passenger which includes a corresponding subscription for use of the aircraft communications system 10 during the scheduled flight. Alternatively, the passenger may also have the opportunity to sign up for wireless services during check-in, upon boarding the aircraft or during the flight itself.

In step 102, the passenger is provisioned for wireless use on the aircraft communications system 10. In one embodiment, provisioning a subscriber unit includes obtaining passenger billing information through the reservation process and configuring a subscriber unit through a subscriber identity module (SIM) card.

Existing subscriber's of the wireless carrier, and other passengers with compatible equipment, may elect to bring their own subscriber units. Existing subscriber information may be transferred from the wireless carrier 40 (e.g., from database 46) to the airline network 52 via a network connection. The airline network 52 may then provide the subscriber information to the aircraft system database 50 in anticipation of a scheduled the flight.

In another embodiment, the wireless carrier 40 supplies subscriber units such as mobile phones which may be provided to a subscriber as part of the check-in process for the flight or sent to the subscriber before the flight. Provisioned aircraft passengers are given an opportunity to try out the wireless carrier's equipment for a limited time (e.g., during a trip) and subscribe to the carrier's wireless network in their home market, if desired, after the passenger returns.

Upon check-in, the subscriber may receive a subscriber identity module (SIM) card or user identity module (UIM) card, which is inserted into the subscriber unit to configure the device for use with the aircraft communications system 10 in accordance with the subscriber's mini-subscription. In alternative embodiments, the subscriber units are configured before being provided to the subscriber, or through other methods, such as Over-The-Air Service Provisioning (OTASP) for a passenger who arrives with a subscriber unit.

The passenger may elect to have calls to an existing phone number forwarded to the loaner equipment. In one embodiment, when the loaner device is provisioned, the passenger's home network is notified that the passenger's wireless device is currently registered with the airline network 52. Calls to the wireless device are first directed to the home network which, via its HLR 46, forwards the call to the airline network 52. The airline network 52 routes the call to the airline issued subscriber unit.

The aircraft communications system 10 stores an electronic serial number (ESN) or mobile equipment identifier (MEID) for each provisioned subscriber unit and assigns a mobile identification number (MIN) or international mobile subscriber identity number (IMSI), which may be dialed from other subscriber units or wireline phones to communicate with the subscriber unit. In one embodiment, each subscriber unit is assigned a MIN on the external wireless carrier's network. When the flight ends the mini-subscription is transferred to the wireless carrier and the subscriber unit maintains the assigned MIN on the wireless carrier's network, allowing the subscriber to continue use of the service.

In step 104, billing data is collected for the passenger's use of the aircraft communications system 10. Call detail records and records of other wireless transactions, such as text messages sent to, and received by, the subscriber unit, are collected by the switch 16 and the billing system 72. The billing system 72 converts each billable transaction into a charge and determines whether usage limits have been exceeded and also whether an amount to bill the subscriber's account. The airline network 52 tracks and bills for subscriber unit communications through a network billing system 56.

The mini-subscription on the aircraft communications system terminates in step 106. In one embodiment, the mini-subscription terminates when the flight ends and use of the airline network is no longer desired. The subscriber may keep the subscriber unit and continue using wireless services available through the wireless carrier, or return the subscriber unit to the airline. If the subscriber keeps the subscriber unit, then in step 108 the mini-subscription is transferred to a selected wireless carrier, establishing a new home system and carrier for the subscriber unit.

The subscription on the wireless carrier may be of a short duration (e.g., two weeks) to provide the subscriber with the opportunity to try the carrier's services. The subscriber is billed by the wireless carrier for the limited use of the wireless carrier network in step 110. In one embodiment, the subscription on the wireless carrier is a prepaid subscription that may be replenished by the subscriber. For existing subscribers, the charges for use of the airline network may be transferred to their current subscription on their home carrier network after the airline relationship ends. The subscriber may return the subscriber unit after a period of use to terminate service, or convert to a full subscription in step 112.

Figure 3:
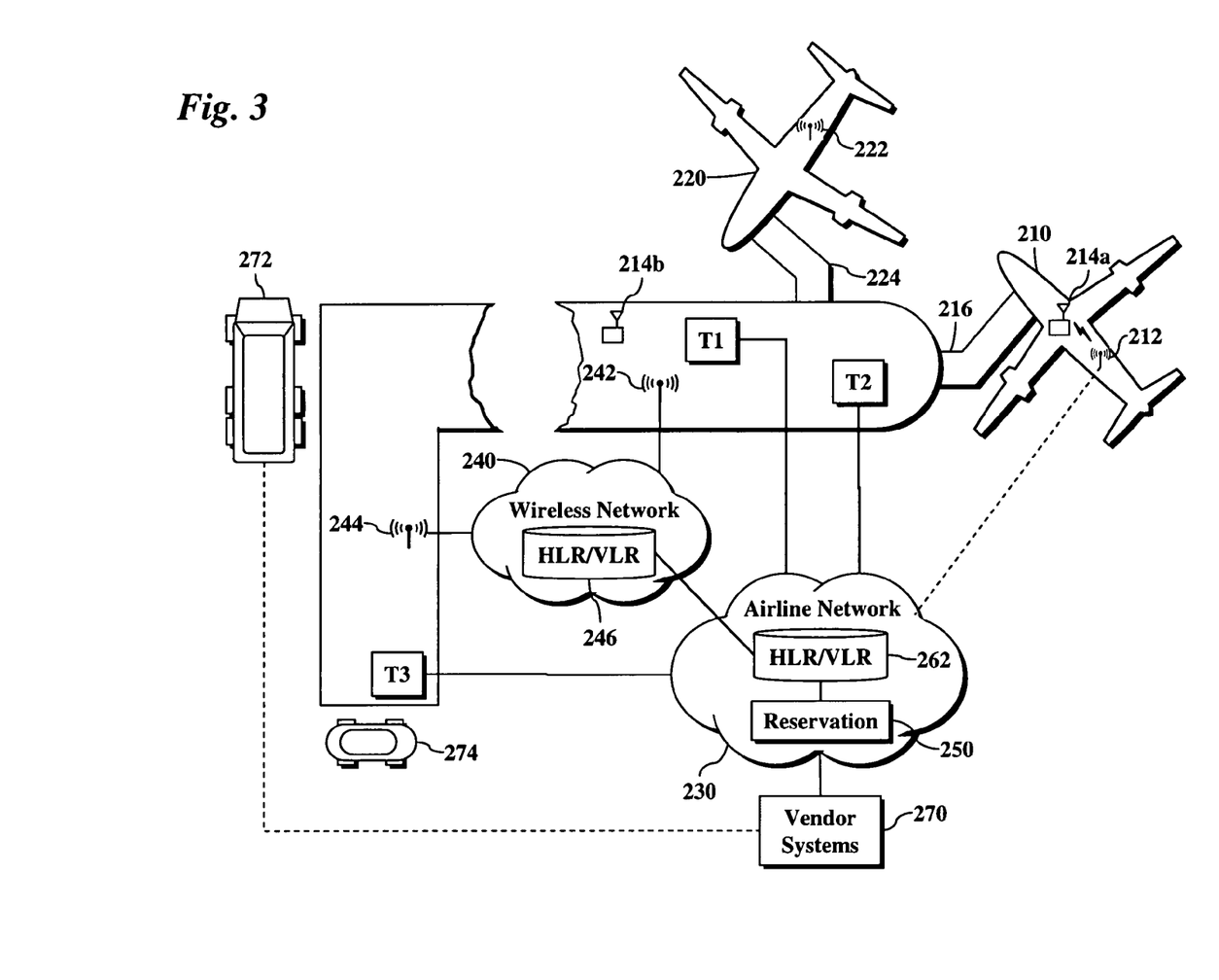
FIG. 3 is an embodiment of an aircraft communications system including location-based services.

An embodiment of an operation of the aircraft system will now be described with reference to FIG. 3. An aircraft 210 includes an aircraft communications system 212 providing wireless services to at least one subscriber unit 214*a*. Other aircraft, such as aircraft 220, may also include an aircraft communications system 222 providing wireless services to its respective passengers.

When the aircraft 210 arrives at a terminal 216, the aircraft communication system 212 connects to the airline network 230 through a wireless connection, wireline connection, or both. In one embodiment, the aircraft communications system 212 is adapted to join an airline network 230 through a wireless network 240. The wireless network 240 includes base stations 242 and 244 providing wireless services within the airport terminal. The wireless network 240 may be a private network operated by the airline within the airport, a carrier network with equipment located at the airport that is adapted for use with the aircraft communications system 212, or may be operated under alternative arrangements. The wireless communications system 212 includes a carrier network base station and is adapted to join the carrier network as a new base station when the airplane is in the vicinity.

Figure 4:
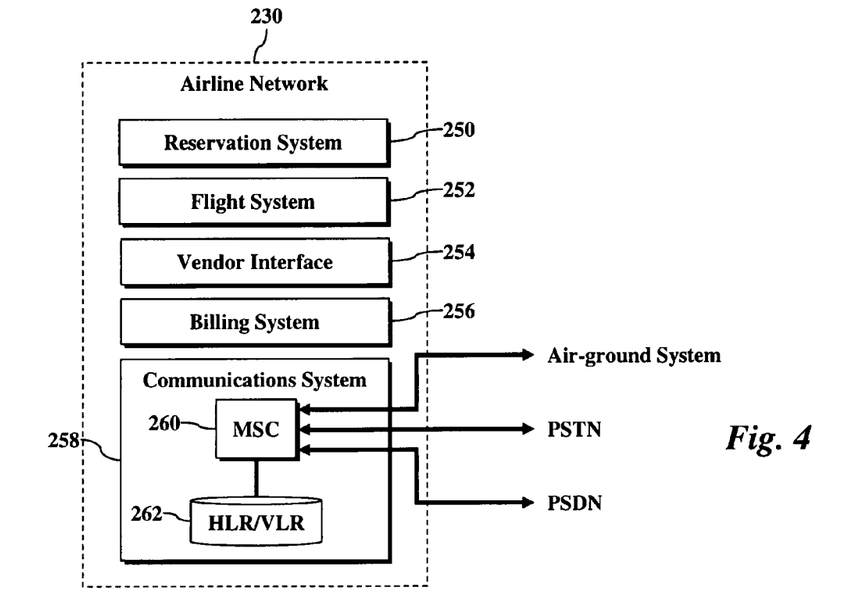
FIG. 4 is an embodiment of an airline network.

The airline network 230 tracks subscriber unit locations and provides location-based services to passengers. For example, a passenger departing an aircraft may turn on a subscriber unit and immediately be provided with important information such as connecting flight status. Referring to FIG. 4, the airline network 230 includes one or more computer systems including a reservation system 250, a flight system 252, a vendor interface 254, a billing system 256 and a communications system 258. The communications system 258 includes a switch 260 and an HLR/VLR database 262, and in operation routes calls to and from an air-to-ground system, PSTN and PSDN. In one embodiment, the airline network 230 tracks aircraft and subscriber unit location. The database 252 includes passenger data including HLR/VLR data for subscriber units provisioned on the airline system 230.

Figure 6:
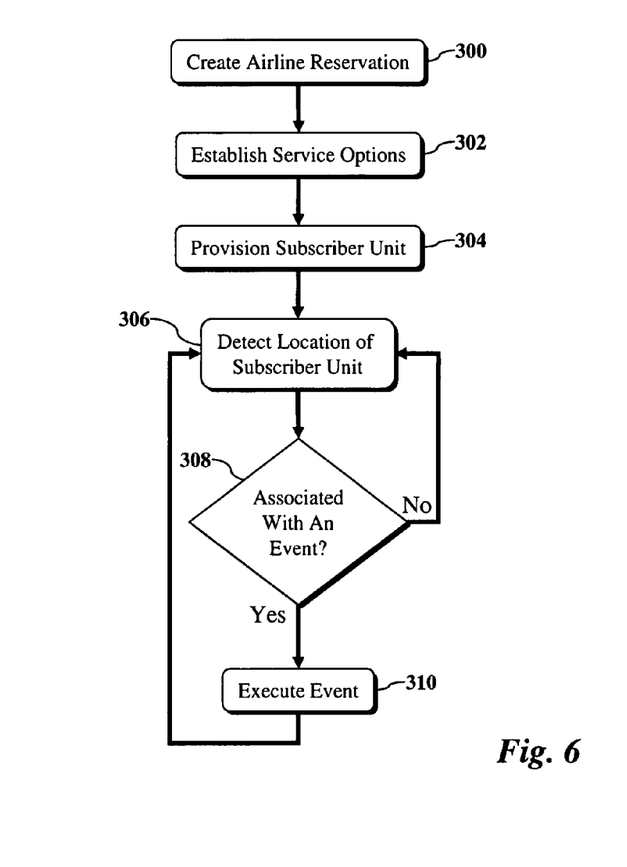
FIG. 6 illustrates an embodiment of a method for implementing location-based services.

An embodiment of a network operation tracking user location is illustrated in FIG. 6 and will be discussed with reference to FIG. 3. In step 300, the subscriber establishes an airline reservation and wireless services, such as the enablement of location based services, are selected in step 302. The subscriber information is stored by the reservation system 250. In step 304, the subscriber unit is provisioned for use on the aircraft. In step 306, the airline system detects the presence of the subscriber unit. When the subscriber unit is turned on within range of the aircraft communications system, the subscriber unit is registered in the HLR/VLR databases of the aircraft and the airline system. As the subscriber unit moves to another system or base station, the location of the subscriber unit is updated. The new registration information may include the current system, previous system and home system for the subscriber unit.

If the registration information has an associated event (step 308), then the event is executed in step 310. For example, if the passenger has reserved a local hotel room, the arrival of the subscriber unit 214*b* at base station 242 may trigger an event causing a notification message to be sent to the hotel. In response, the hotel may dispatch a shuttle bus 272 to transport the passenger from the airport to the hotel or arrange for other services in anticipation of the passenger's arrival. If the passenger 214 has a rental car reservation, the arrival of the passenger 214 may be transmitted to terminal T3 through the vendor system 270, which notifies the rental agency that the passenger has landed and may arrive shortly.

Figure 5:
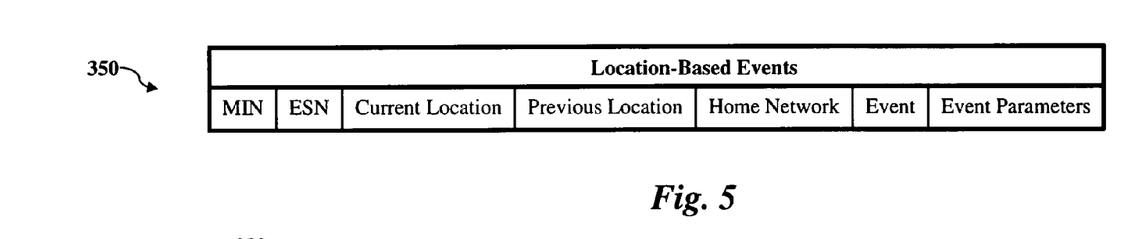
FIG. 5 is an exemplary data structure for use in implementing location-based services.

An embodiment of an exemplary database table 350 for use with location-based services is illustrated in FIG. 5. Each entry includes an identification of the subscriber unit, MIN & ESN, and network registration information including current location, previous location and home network. When an HLR registration occurs, the subscriber unit and registration information are queried and if a corresponding entry exists, the associated event and event parameters are executed.

Figure 7:
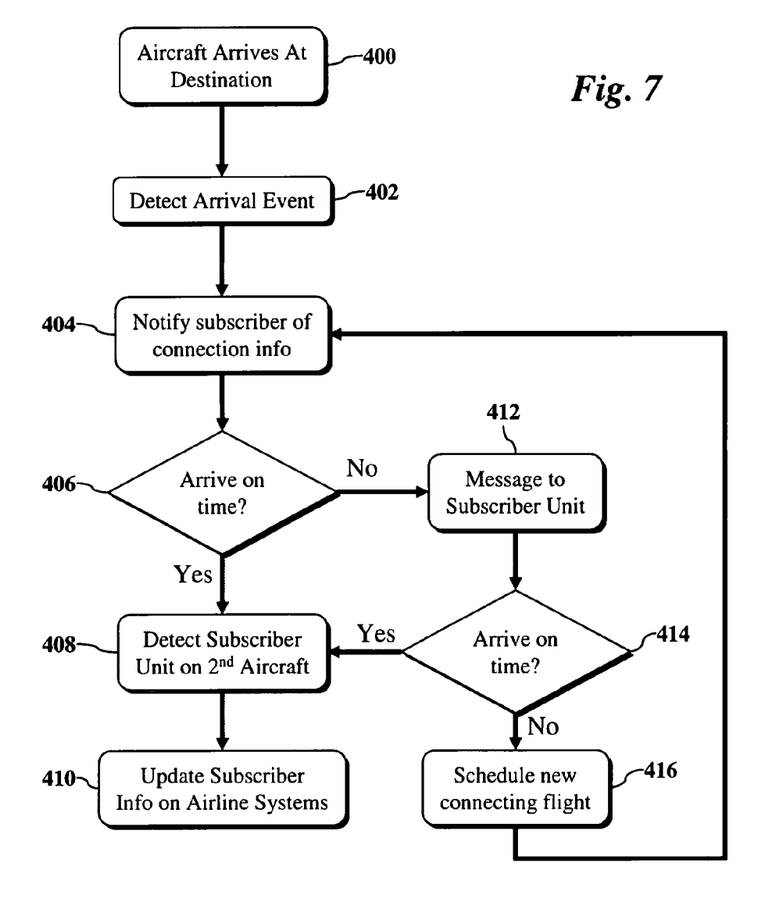
FIG. 7 illustrates an embodiment of a method for implementing location-based services relating to connecting flights.

Another embodiment of subscriber tracking is illustrated in FIG. 7 and will be described with reference to FIG. 3. In step 400, the aircraft arrives at a destination and, if available, connects to a local network. In step 402, the airline system detects the arrival of the subscriber unit. In alternate embodiments, the subscriber's arrival may be determined from the aircraft's arrival at the terminal or determined upon registration of the subscriber unit on a local wireless network. If passenger 214 is scheduled to catch a connecting flight on aircraft 220, then in step 404 the airline system transmits connection information to the subscriber, such as through an automated voice message, a text message, or a web page displayed on the subscriber unit.

If the subscriber arrives on time for the connecting flight (step 406), the subscriber unit is detected on the second aircraft communications system 220 in step 408, and subscriber information is updated in the airline network 230 in step 410. If the subscriber is late for the connecting flight then a reminder message is sent to the subscriber unit 214 in step 412, either automatically from the airline system or manually from the terminal T1. Communications may also take the form of a telephone call to subscriber unit 214. If the subscriber does not arrive on time for the connection, then a new connecting flight is automatically reserved for the subscriber unit in step 416, and the subscriber is notified of the new information in step 404.

In one embodiment, the airline system 214 may also notify terminals T1 and T2 of the passenger's arrival. Terminal T1 provides notice to flight personnel at gate 224 that passenger 214 has arrived. Terminal T2 provides information to flight personnel at gate 216 to aid the flight personnel in directing passenger 214 to the appropriate connecting flight.

Figure 8:
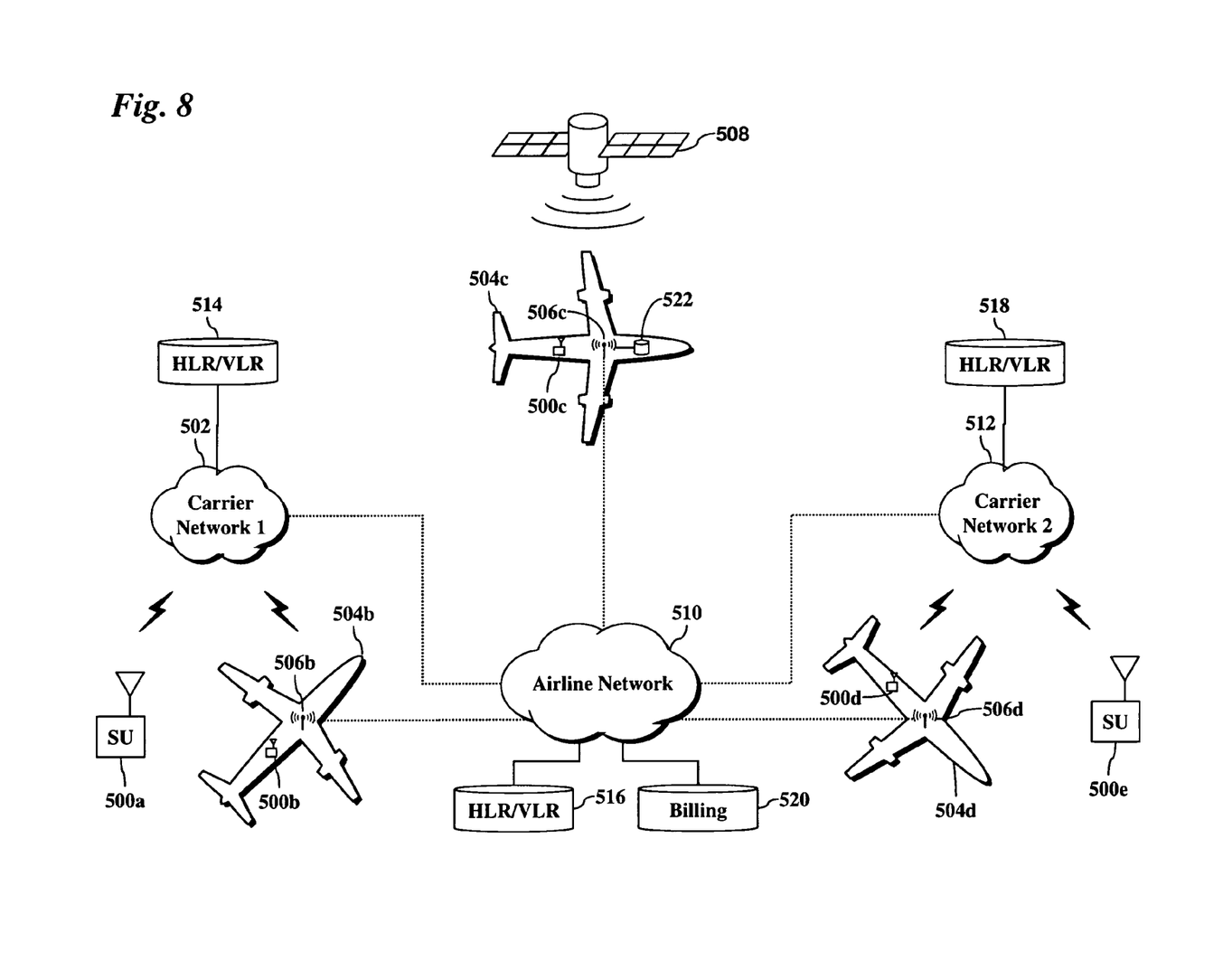
FIG. 8 illustrates an embodiment of an airline network.

Referring to FIG. 8, the operation of the airline network will be described in greater detail. As a passenger travels between two locations wireless communications are facilitated by available communications systems. In one embodiment, a subscriber unit 500a is a subscriber on a first wireless network 502 which provides wireless services while the subscriber unit 500a is within its coverage area. When the subscriber unit 500b enters an aircraft 504b communications may be facilitated through the wireless network 502 or the aircraft wireless communications system 506b. When the aircraft 504c is in flight, the subscriber unit 500c communicates with external systems through the aircraft communications system 506c via a satellite 508. The destination includes a second wireless network 512 providing wireless access to the subscriber unit 500e as a roaming subscriber after the passenger leaves the aircraft.

When the subscriber initially registers with the aircraft communications system 506b, the aircraft communications system 506b transmits a message to the home HLR 514 which records the location of the phone in an HLR database 516 on the airline network 510. Calls to the subscriber unit 500 from an external system are directed to the first wireless network 502, which forwards the call to airline network 510. The airline network 512 routes the call to the aircraft 504, which routes the call to the subscriber unit 500.

At the destination location, the subscriber unit registers with carrier network 512, which requests information from the subscriber's home HLR 514. The home network logs the new location and returns a message with the subscriber's feature list and billing information which is stored in database 518. The billing rates will terminate within a discrete period of the time, such as when the subscriber returns home. In this manner, the subscribers are provided with local calling rates to phones in the area.

In another embodiment, the wireless networks 502 and 512 operate on incompatible technologies such that the subscriber unit cannot operate on the second wireless carrier. The airline provides the subscriber with a new phone for the trip that is compatible with the destination wireless carrier. The first subscriber unit is registered with the airline communications system, and the subscriber is then given a second device for use during the trip. Telephone calls to the first device are routed to the second device through the airline communications system. The second device is compatible with the aircraft system and the destination device, and is homed on the airline system. In an alternate embodiment, the home network is the destination wireless carrier. In another embodiment, the airline provides a SIM card to configure the subscriber unit for use with the destination network. Upon check in the airline may provide the user with a new subscriber device that is compatible with the destination. The subscriber may elect to have the calls forwarded to the airline system which will forward the calls to the new device.

The wireless communications system of the exemplary embodiments also provides cost effective communications for the aircraft and personnel. Each employee of the airline can be provisioned a subscriber unit that is homed on the aircraft network. This may reduce costs for roaming and long distance/international calls.

When the aircraft is in flight, the wireless communications system may facilitate data transfers with the airline network. In one embodiment, the wireless applications include a credit card processing application and credit card transactions may be completed during flight through the satellite interface.

The satellite interface may also be used to facilitate the downloading of maintenance information 522. Aircraft typically connect to a data port at an airport terminal after the aircraft lands to offload maintenance information, such as information typically stored in an aircraft black box. In accordance with an embodiment of the present invention, maintenance data 522 is offloaded during the flight via the satellite 508 allowing maintenance information to be analyzed during flight and reducing turn around time between flights. Other information, such as billing information may also be downloaded and forwarded to the home airline system. The airline billing system can provide the subscriber with a single bill for all related services.

Having thus described various embodiments of the present invention, it should be apparent to those skilled in the art that certain advantages of the within described system have been achieved. It should also be appreciated that various modifications, adaptations, and alternative embodiments thereof may be made within the scope and spirit of the present invention.

What is claimed is:

1. A method of operating a wireless communications system for use with an aircraft, the method comprising:
providing a wireless communications system in the aircraft, the wireless communications system including a base station, a switch and an interface to an external network, wherein the wireless communications system includes equipment compatible with a wireless carrier, the wireless communications system adapted to join the wireless carrier network when the aircraft is within range of the wireless carrier network;

establishing an airline reservation, the airline reservation including a flight identifier, a mobile station identifier, and a vendor service identifier;

providing wireless communications services to a subscriber unit located in the aircraft, the subscriber unit being associated with the mobile station identifier;

detecting an event associated with the subscriber unit; and transmitting, in response to the event, a message to a vendor system associated with the vendor service identifier.

2. The method of claim 1 wherein the identified vendor service is a rental car reservation.

3. The method of claim 1 wherein the identified vendor service is a hotel reservation.

4. The method of claim 1 wherein the detected event is an arrival of the aircraft at a destination associated with the identified vendor service.

5. The method of claim 1 further comprising establishing a mini-subscription for the subscriber unit, the mini-subscription providing temporary access to the wireless communications system in accordance with the airline reservation.

6. The method of claim 1 further comprising providing a full subscription for the subscriber unit on the wireless carrier network, the subscriber unit being identified on the external wireless carrier by the mobile station identifier.

7. In an airline communications network facilitating wireless communications for an aircraft, a method for wireless roaming between disparate wireless networks comprising the steps of:

establishing a roaming relationship between a first wireless network and the airline communications network;

establishing a roaming relationship between a second wireless network and the airline communications network;

at a first location, registering a subscriber unit for use on a mobile network, the subscriber unit being homed at the first wireless network and roaming on the mobile network;

transporting the mobile network and the subscriber unit to a second location via aircraft;

registering the subscriber unit for use on the second wireless communications system as a roaming device; and routing subscriber unit communications through the airline communications system.

8. The method of claim 7, further comprising the step of receiving at the airline communications network a subscriber profile from the first wireless network, the subscriber profile associated with the subscriber unit.

9. The method of claim 8, further comprising the steps of:

modifying the subscriber profile setting the aircraft communications system as a home network; and transmitting the modified subscriber profile to the second wireless network, whereby incoming communications directed to the subscriber unit are forwarded to the airline communications system.

10. The method of claim 9, further comprising the step of collecting, at the airline communications system, billing information for the subscriber unit's use of the second wireless communications system.

11. An airline communications system comprising:

an airline network including:
  a reservation system including a database storing passenger and flight information, the reservation system including logic for provisioning a subscriber unit and defining at least one location-based event;
  a first interface to an external network; and
  a home location register tracking a location of the subscriber unit; and an aircraft communications system including a wireless base station facilitating radio communication with the provisioned subscriber unit and a second interface to the external network, wherein the home location register includes logic for detecting the subscriber unit's movement into the location associated with the location-based event, and executing the location-based event.

12. The airline communications system of claim 11 wherein the location is an aircraft destination and the event is a transmission of a notification message to a vendor.

13. The airline communications system of claim 12 wherein the location is an aircraft destination and the event is a transmission of a connecting flight information associated with the subscriber's reservation to the subscriber unit.

14. The airline communications system of claim 11 wherein the airline network further includes an interface to a wireless carrier, and wherein the provisioning of the subscriber unit includes establishing a mini-subscription providing temporary access to the wireless communications system in accordance with reservation information.

15. The airline communications system of claim 11 wherein the aircraft communications system further includes an interface to aircraft maintenance data, wherein the second interface includes an interface to a satellite communications system, and wherein the aircraft maintenance data is downloaded to the airline network via the second interface during aircraft flight.

16. The airline communications system of claim 11 wherein the aircraft communications system further includes a display and a cellular alarm function, wherein the cellular alarm function is adapted to identify active subscriber units and provide a notification through the display of unauthorized wireless communications.

17. The airline communications system of claim 16 wherein the aircraft communications system includes a cache storage and is adapted to serve data content from an external server to the provisioned subscriber unit, the requested data content being delivered from the cache, if available.

18. The airline communications system of claim 11 further comprising a wiretap monitoring system adapted to receive communications between the second interface and the external network.

* * * * *